United States Patent
Batni et al.

(10) Patent No.: US 8,270,590 B2
(45) Date of Patent: *Sep. 18, 2012

(54) USER MESSAGE DELIVERY TO CALLING PARTY DEVICE

(75) Inventors: Ramachendra P. Batni, Phoenix, AZ (US); Sanjoy Paul, Morganville, NJ (US)

(73) Assignee: Alcatel Lucent, Paris (FR)

( * ) Notice: Subject to any disclaimer, the term of this patent is extended or adjusted under 35 U.S.C. 154(b) by 1229 days.

This patent is subject to a terminal disclaimer.

(21) Appl. No.: 11/453,678

(22) Filed: Jun. 15, 2006

(65) Prior Publication Data

US 2007/0291927 A1    Dec. 20, 2007

(51) Int. Cl.
*H04M 3/00*    (2006.01)
(52) U.S. Cl. ............... 379/257; 379/114.1; 379/114.13; 379/201.01; 379/201.02; 379/201.08; 379/373.01; 379/911; 455/567
(58) Field of Classification Search ............. 379/257, 379/67.1, 114.13, 201.01, 373.01, 88.17, 379/114.1, 201.02, 201.08, 207.16, 911; 455/567
See application file for complete search history.

(56) References Cited

U.S. PATENT DOCUMENTS

| | | | | |
|---|---|---|---|---|
| 6,097,802 | A  | * | 8/2000 | Fleischer et al. ......... 379/211.02 |
| 2004/0091093 | A1 | * | 5/2004 | Bookstaff ................ 379/201.01 |
| 2004/0114732 | A1 |   | 6/2004 | Choe et al. |
| 2005/0185771 | A1 | * | 8/2005 | Benno et al. ............... 379/88.17 |
| 2006/0023862 | A1 |   | 2/2006 | Sutcliffe |
| 2006/0291639 | A1 | * | 12/2006 | Radziewicz et al. ..... 379/211.01 |

FOREIGN PATENT DOCUMENTS

| | | |
|---|---|---|
| EP | 1 617 640 | 1/2006 |
| WO | WO 2004/084566 A1 * | 9/2004 |

* cited by examiner

*Primary Examiner* — Ahmad Matar
*Assistant Examiner* — Antim Shah
(74) *Attorney, Agent, or Firm* — Carmen Patti Law Group, LLC

(57) ABSTRACT

In one embodiment, a call setup message for a call from a calling party device to a called party device is received. At least one calling party parameter for the calling party device is determined. A user message is selected based on the at least one calling party parameter. Delivery of the user message to the calling party device is initiated in parallel with a call setup for the call from the calling party device to the called party device.

21 Claims, 3 Drawing Sheets

USER MESSAGE DELIVERY TO CALLING PARTY DEVICE

TECHNICAL FIELD

The invention relates generally to message communications and more particularly to message communications to calling party devices.

BACKGROUND

Existing ringback services enable wireless or wireline service subscribers to pre-select audio and multimedia content to be played to communication devices by which calls are initiated to the service subscribers. The pre-selected audio and multimedia content replaces a traditional ringing sound heard by a calling party before the called party answers. As such, the ringback service enables the called party to customize audio and multimedia content that a calling party hears or sees during call setup between the calling party device and the called party device.

SUMMARY

The invention in one implementation encompasses a method. A call setup message for a call from a calling party device to a called party device is received. At least one calling party parameter for the calling party device is determined. A user message is selected based on the at least one calling party parameter. Delivery of the user message to the calling party device is initiated in parallel with a call setup for the call from the calling party device to the called party device.

Another implementation of the invention encompasses an apparatus. The apparatus comprises a network component of a communication network that receives an incoming call that is redirected by a mobile switching center in parallel with a call setup of the incoming call. The incoming call is for a called party device and from a calling party device. The network component determines at least one calling party parameter for the calling party device. The network component selects a user message based on the at least one calling party parameter. The network component initiates delivery of the user message to the calling party device in parallel with the call setup of the incoming call by the mobile switching center.

A further implementation of the invention encompasses an apparatus. The apparatus comprises a calling party network and a called party network. The calling party network comprises a network component and a serving mobile switching center. The serving mobile switching center redirects an incoming call to the network component in parallel with a call setup of the incoming call. The incoming call is for a called party device and from a calling party device. The network component determines at least one calling party parameter for the calling party device. The network component selects a user message based on the at least one calling party parameter. The network component initiates delivery of the user message to the calling party device in parallel with a call setup of the incoming call by the serving mobile switching center.

DESCRIPTION OF THE DRAWINGS

Features of example implementations of the invention will become apparent from the description, the claims, and the accompanying drawings in which:

DETAILED DESCRIPTION

Figure 1:
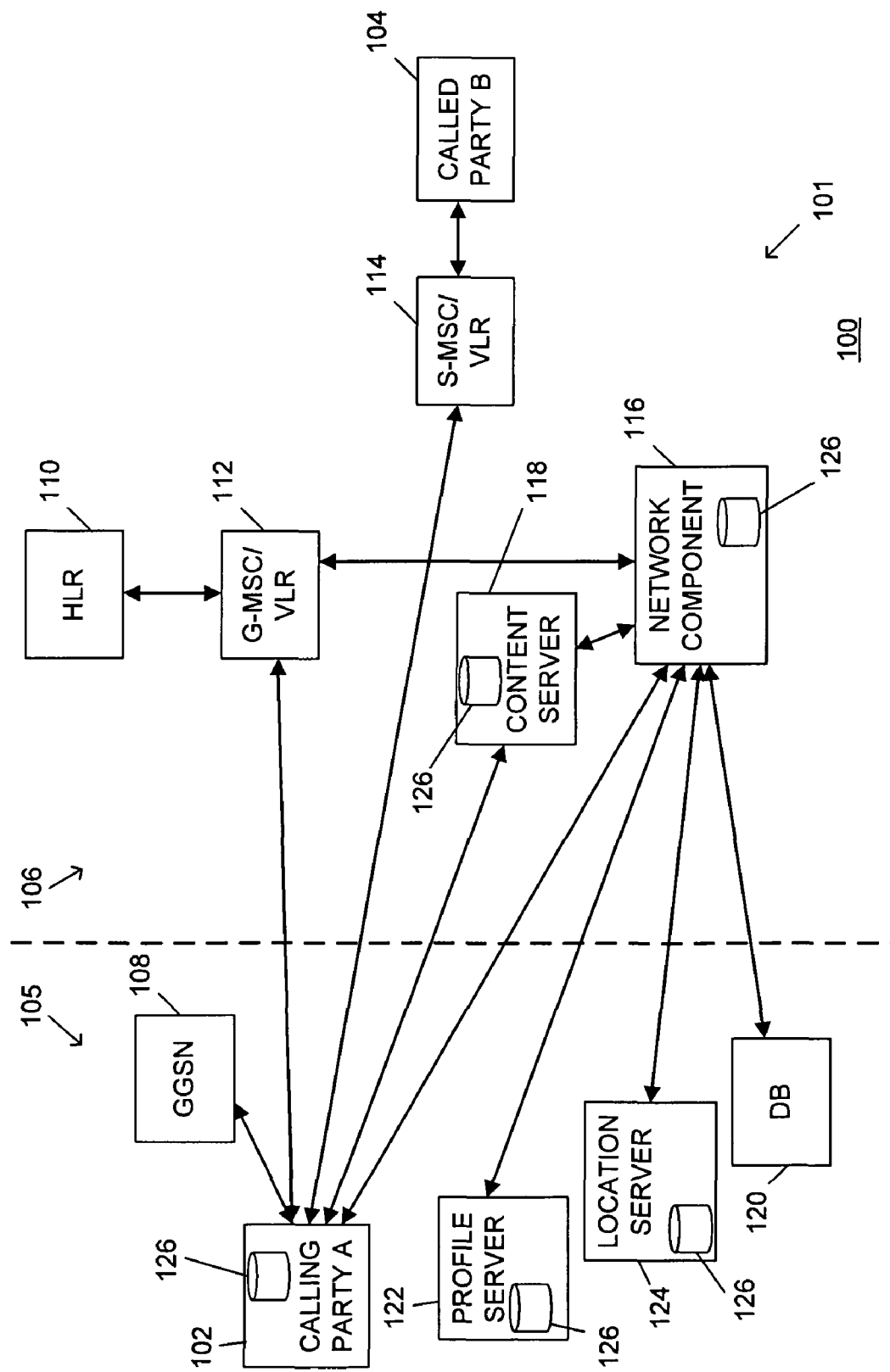
FIG. 1 is a representation of one implementation of an apparatus for user message communication to a calling party device.

Turning to FIG. 1, an apparatus 100 in one embodiment comprises a communication network 101 with a calling party device 102 that places an incoming call to a called party device 104. The calling party device 102 and the called party device 104 in one example comprise mobile phones, personal digital assistants (PDAs), computers, or other like communication devices. The apparatus 100 comprises a calling party network 105 and a called party network 106. The calling party device 102 is a member of the calling party network 105 and the called party device 104 is a member of the called party network 106. For example, the calling party network 105 provides communication service to the calling party device 102 and the called party network 106 provides communication service to the called party device 104. The calling party network 105 and the called party network 106 may comprise a General Packet Radio Service (GPRS) network, a Global System for Mobile (GSM) network, a Third Generation (3G) wireless network (e.g., a Wideband Code Division Multiple Access (WCDMA) network, a Universal Mobile Telecommunications System (UMTS) network, a CDMA2000 network, Internet Protocol Multimedia Subsystem (IMS) network, and the like), a Fourth Generation (4G) wireless network, a WIFI (802.11 a/b/e/g/n/p), WiMAX (802.1116 d) or WiBro (802.1116 e) wireless network, and like wireless networks as known in the art. The calling party network 105 and called party network 106 need not be of the same type, but need to interwork to set up communication between the two end devices. The calling party network 105 and the called party network 106 in one example are the same network.

The calling party network 105 and the called party network 106 in one example comprise pre-IMS (internet protocol multimedia subsystem) networks with separate channels for audio and data. For example, the networks are circuit switched for audio (e.g., voice) communication with the calling party device 102 and packet switched for data communication with the calling party device 102. In the embodiment of FIG. 1, the called party network 106 comprises a Home Location Register (HLR) 110, a Gateway Mobile Switching Center with Visitor Location Register (G-MSC/VLR) 112, a Serving Mobile Switching Center with Visitor Location Register (S-MSC/VLR) 114, a network component 116, and a content server 118.

The called party network 106 is configured to provide a user message communication service to the calling party device 102. The user message in one example comprises an advertisement message. The network component 116 and the content server 118 cooperate to provide audio, text, still images, animated images, video, hypertext markup language (HTML) content, and/or multimedia to the calling party device 102 in parallel with call setup for a call to the called party device 104. The network component 116 and the content server 118 may share responsibility for providing the user message communication service. In one example, the network component 116 comprises an advertisement server that performs selection of the user message and the content server 118 provides storage and delivery of the user message to the calling party device 102. In another example, the network component 116 and the content server 118 comprise a same component, for example, the network component 116 performs selection, storage, and delivery of the user message. Those skilled in the art will recognize that alternative implementations may be configured with one or more software and/or hardware modules performing the selection, storage, and delivery of the user message. In addition, the content delivered to the user may be trans-coded or transformed to meet the characteristics of the calling party device 102 and/or the characteristics of the calling party network 105.

The calling party device 102 in one example comprises a user interface for presentation of the user message. For example, the calling party device 102 plays at least one of an audio tone, audio message, displays an image, or plays a video to a user of the calling party device 102. In a further example, the calling party device 102 comprises a user interface for display and/or modification of at least one user-defined parameter of a user profile, as described herein. Examples of user interfaces for display or modification comprise interactive voice response, touch-tone, short message service, wireless application protocol (WAP), and world wide web (WWW) pages.

The network component 116 in one embodiment comprises a ringback tone server. For example, the called party network 106 and the network component 116 are configured to provide a ringback tone service for the called party device 104. The network component 116 may provide a multimedia ringback service for the called party device 104. For example, the network component 116 communicates a multimedia ringback tone to the calling party device 102. Those skilled in the art will recognize that the ringback tone service is a called party service, whereas the user message communication service is a calling party service. For example, while a recipient of both services is the calling party, the ringback tone service uses the called party's information and subscription data to provide the service, while the user message communication service uses the calling party's information, subscription data, and/or location. Both services are provided by the called party's network to the calling party.

In one example, the user message communication service is an opt-in service, for example, when the user messages communicated to the calling party are advertisement messages for an advertisement service. In this example, a service provider of the calling party network 105 may offer an incentive for a user of the calling party device 102 to opt into the service, such as discount coupons, lower subscription rate, or other like benefits. In addition, the opt-in service need not be "yes"/"no" rather the user may be given the option to "hide" or "reveal" pieces of information about him(her)self to influence the choice of content to be played to the called party.

In the called party network 106, the network component 116 may establish an audio channel with the calling party device 102 for playback of a tone or other audio messages. The network component 116 may also send a data content address or Uniform Resource Identifier (URI) such as a Uniform Resource Locator (URL), a Uniform Resource Name (URN), and the like, to the calling party device 102 for establishment of at least one data channel between the calling party device 102 and the content server 118. The network component 116 and the content server 118 in one example employ at least one data channel to send an image, video (e.g., video stream or downloaded video), short message service (SMS) message, or other data message to the calling party device 102. The video may also have an embedded audio channel or audio track.

Figure 2:
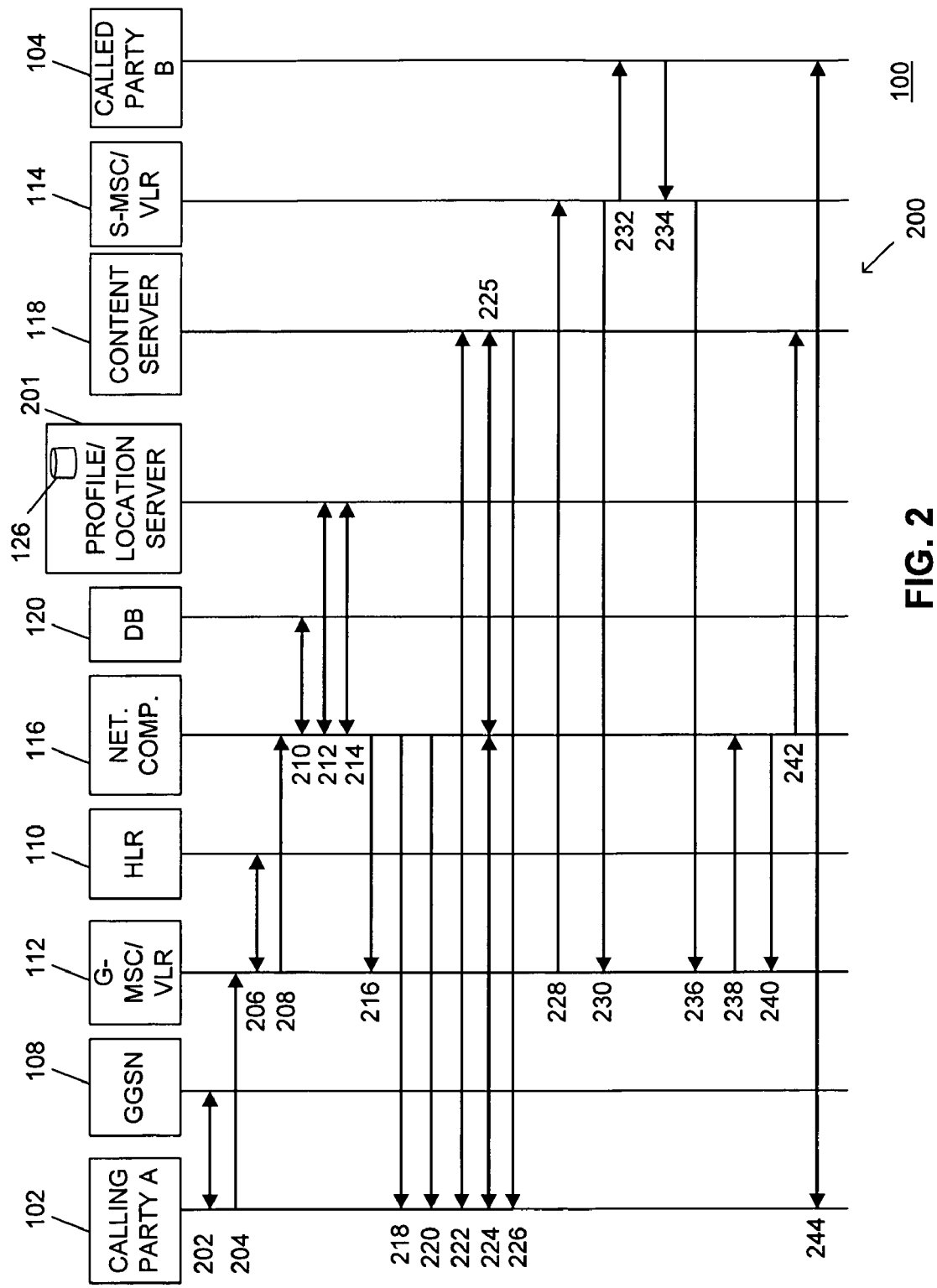
FIG. 2 is a representation of one example of a message flow for the apparatus of FIG. 1.
Figure 3:
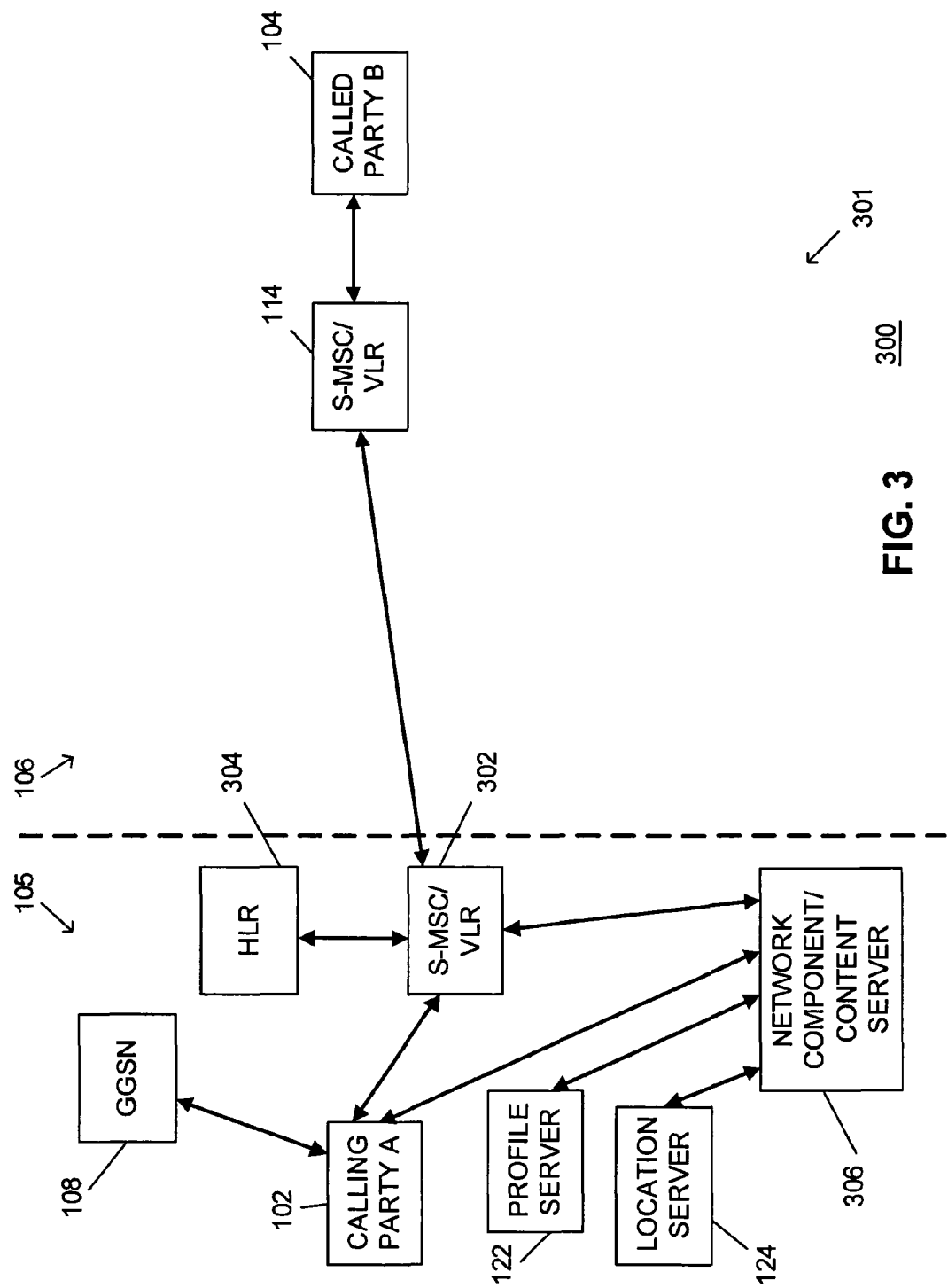
FIG. 3 is a representation of another implementation of the apparatus of FIG. 1.

The calling party network 105 in one example comprises a Gateway General Packet Radio Service Support Node (GGSN) 108, a database (DB) 120, a profile server 122, and a location server 124. The database 120 in one example comprises an authentication, authorization and accounting (AAA) RADIUS billing record database. The profile server 122 comprises a user profile for the user of the calling party device 102. The location server 124 comprises or determines location information for the calling party device 102. The location server 124 may use various methods and/or devices to determine the location of the calling party device 102, for example, triangulation, global positioning system (GPS), mapping the directory number of the calling party device 102 to a location, or a reverse IP address lookup table. In one example, the profile server 122 and the location server 124 comprise a same component, for example, profile/location server 201 (FIG. 2). It is noted that, though not explicitly shown in the figures, the called party network 106 may also have similar elements that interwork with their peers in the calling party network 105 in obtaining the information needed by the network component 116. Although the embodiments of FIGS. 1, 2, and 3 are described using a universal mobile telephone system (UMTS) network architecture (using network components such as GGSN), those skilled in the art will appreciate that alternate embodiments are possible with different network architectures, for example, with a code division multiple access (CDMA) network (where a packet data serving node, PDSN, would be the network element corresponding to GGSN) or IMS network.

At least one of the calling party device 102, the network component 116, the content server 118, the profile server 122, the location server 124, and the profile/location server 201 in one example comprise an instance of a recordable data storage medium 126, as described herein.

An illustrative description of operation of the apparatus 100 is presented, for explanatory purposes. Turning to FIG. 2, one example of a message flow 200 for the apparatus 100 is shown for a GPRS communication network. In STEP 202, the calling party device 102 sets up a packet data protocol (PDP) context with the GGSN 108 to enable the calling party device to send or receive data at some subsequent time. The user of the calling party device 102 initiates (STEP 204) a voice call (e.g., an incoming call) to the called party device 104. The call gets routed per normal telecommunications network procedures to reach the G-MSC/VLR 112 associated with the called party device 104. The G-MSC/VLR 112 queries (STEP 206) the HLR 110 for call routing and service subscription information for the called party device 104. The response from the HLR indicates to the G-MSC/VLR 112 that the incoming call needs to receive message service. Accordingly, the G-MSC/VLR 112 redirects the incoming call to the network component 116 by sending (STEP 208) a call setup message or IAM to the network component 116. For example, the call setup message or IAM contains the directory number of the calling party device 102 and the directory number of the called party device 104. In one example, redirecting the incoming call to the network component 116 is a default behavior or default call routing provided by the HLR 110.

The network component 116 comprises a lookup table that associates North American Numbering Plan numbers (i.e., NPA-NXX) with network service providers and corresponding addresses for at least one DB 120 of each service provider. The network component 116 employs the directory number of the calling party device 102 to perform the lookup of an identifier (e.g., the address or a service provider ID) for a service provider of the calling party device 102. The network component 116 constructs a network access identifier (NAI) for the calling party device 102, for example, using the directory number of the calling party device 102, the service provider ID, or other parameters known in the art. The network component 116 queries (STEP 210) at least one of the DB 120 for a data channel address of the calling party device 102, for example, an internet protocol address.

The network component 116 in one example obtains (STEP 212) the user profile for the user of the calling party device 102 from the profile/location server 201. The network component 116 may also determine (STEP 214) the location of the calling party device 102. In STEP 214, the network component 116 in one example sends a request for the location of the calling party device 102 with at least one location parameter. Examples of location parameters comprise a directory number of the calling party device 102, a data channel address of the calling party device 102, and a requested granularity of location information (e.g., street address, zip code, city, area code, state, etc.). Where the profile server 122 and the location server 124 comprise a same component such as the profile/location server 201, the network component 116 in one example may send a single message to the profile/location server 201 to obtain both the user profile and the location of the calling party device 102. In an alternative example, the network component 116 determines the location of the calling party device from the directory number of the calling party device or a data channel address of the calling party device. In this example, the network component 116 does not query the profile/location server 201. For example, the network component 116 may determine an area or zip code for the calling party device 102 based on the directory number of the calling party device 102.

The network component 116 selects the user message for communication to the calling party device 102. The network component 116 in one example determines at least one calling party parameter and selects the user message based on the calling party parameter. Examples of calling party parameters comprise a data channel address of the calling party device 102, the user profile for the user of the calling party device 102, and the location of the calling party device 102. In another example, the network component 116 may select the user message based solely on the calling party device 102 and other internally known parameters of the network component 116, such as time of day or day of week, etc. The network component 116 may select the user message based on previously delivered user messages. For example, the network component 116 may throttle delivery of the user messages such that a limited number of user messages are sent in a predetermined time period (e.g., four user messages per day), a limited number of user messages are sent from a message category (e.g., three user messages for clothing sales), or a single user message is sent a limited number of times (e.g., a one-time user message for a sale item).

The user profile comprises data for selection of the user message, for example, opt-in status, demographic information, user preferences, personality type or characteristics, capabilities of the calling party device 102, bandwidth available to the calling party device 102, quality of service levels, commercial product interests, user message throttling levels, and other criteria as appreciated by those skilled in the art. For example, the network component 116 may determine the opt-in status or other data from the user profile for selection of the user message. The user profile may also comprise account settings for the calling party device 102, such as billing information, account status, network resource permissions, and others, as will be understood by those skilled in the art. The user profile may comprise additional information to characterize the user, such as "Sports enthusiast", "Comedy lover", a list of favorite stores, sale items of interest, etc. The user profile may also comprise a status of the user (e.g., "at home", "at the office", "driving", "out of town", etc.). The user may activate a status to alter the user profile. The user profile in one example comprises a location parameter that identifies a user preference for a home location or current location for selection of the user message. For example, if the location parameter indicates a home location, the network component 116 selects user messages based on the user's home area even if the user is currently traveling outside of the home area.

The calling party device 102 can receive an audio channel for voice and audio communication. Examples of embodiments for the audio channel comprise a circuit-switched network, packet-switched network, voice over internet protocol (VoIP), and others, as will be appreciated by those skilled in the art. The calling party device 102 may also receive at least one data channel, for example, for packet-switched data, short message service (SMS), or other data communication. The network component 116 may select a user message that utilizes one or both channels. The user message may comprise a plurality of user messages to be delivered in parallel or in succession across the audio and/or data channels. Examples of user messages comprise: an audio message over the audio channel; an audio message over the audio channel and an image message over a data channel; a text message, an image message, and a video message provided in succession over at least one data channel, and others, as will be appreciated by those skilled in the art. If no data channel address is received in STEP 210 from any of the queried DB 120 within a time period, the network component 116 concludes that the calling party device cannot currently receive data messages and therefore selects only an audio message to be communicated to the calling party device 102. The time period may be provisioned in the network component 116. It could also be that the calling party device 102, being currently used by the calling party, is not capable of data communication in which case again the network component 116 will be correct in selecting to communicate only an audio message to the calling party device 102. In one example, the network component 116 maintains or obtains a list of device capabilities for the calling party device 102 and determines whether or not to query for the data channel address of the calling party device 102 based on the list, as will be appreciated by those skilled in the art.

The network component 116 sends (STEP 216) a confirmation message (e.g., address complete message) to the G-MSC/VLR 112 to confirm an audio channel with the calling party device 102. The network component 116 communicates (STEP 218) an audio user message to the calling party device 102 over the audio channel. Where the user message will be sent over a data channel, the network component 116 sends (STEP 220) a data content address or uniform resource locator (URL) to the calling party device 102 for establishment of a data channel. In one example, the data content address is sent using user datagram protocol (UDP). The data content address comprises an address for the user message. Where the user message comprises a plurality of user messages, the network component 116 may send (STEP 220) at least one data content address or URL to the calling party device 102 for establishment of at least one data channel. For example, the network component 116 may send a first data content address for an image and a second data content address for a video to the calling party device 102. The network component 116 may send the one or more data content addresses in a single message or in separate messages. For example, the network component 116 performs one instance of STEP 220 for each data content address. The calling party device 102 may establish a single data channel for all of the data messages or multiple data channels for the data messages, as will be appreciated by those skilled in the art.

Where the user message comprises for example an image, animated image, or HTML content, the calling party device 102 in one example requests (STEP 222) the user message from the content server 118, for example, using HTTP over a data channel. Where the user message comprises for example a video user message, the calling party device 102 requests (STEP 224) the video user message from the network component 116, for example, using real time streaming protocol (RTSP) or another streaming protocol over a data channel. The network component 116 in one example comprises a server side RTSP stack for exchanging RTSP messages (or other video stream parameters) with the calling party device 102. The network component 116 and the calling party device 102 exchange the video stream parameters (e.g., RTSP DESCRIBE and SETUP messages) for initialization of a video stream, for example, a real time protocol (RTP) stream. The RTSP messages in one example comprise port numbers and video stream parameters for delivery of the video user message to the calling party device 102. While FIG. 2 depicts only one instance of STEPS 220, 222, and 224, those skilled in the art will understand that multiple instances of STEP 220 may be performed by the network component 116, with corresponding STEPS 222 and/or 224 in response by the calling party device 102.

In the embodiment where the network component 116 is separate from the content server 118 and the user message comprises a video user message, the network component 116 in one example comprises a client side stack for exchanging RTSP messages with the content server 118. The network component 116 requests (STEP 225) the user message from the content server 118 but requests that the video user message be delivered to the calling party device 102, for example, to the IP address and port number of the calling party device 102. Upon setup of the video stream, the calling party device 102 may begin the video user message by sending a request to the network component 116, for example, an RTSP PLAY message. The network component 116 receives and forwards the RTSP PLAY message to the content server 118 to initiate (STEP 226) the data stream or video user message. In one example, the network component 116 controls a duration of the video stream. For example, the network component 116 forwards the RTSP play message with a RANGE parameter to force a playback of the video user message for a predetermined time interval prior to connecting the incoming call to the called party. The network component 116 has information about when the audio channel was initiated and also when the data channel was initiated. The network component 116 in one example establishes a mapping between the audio user message and the data user message. The network component 116 may use the mapping to turn off, stop, or disable the audio user message, for example, if the video user message comprises an audio track.

The G-MSC/VLR 112 sets up the incoming call to the called party device 104 by sending (STEP 228) a call setup message or IAM to the S-MSC/VLR 114. STEP 228 in one example occurs in parallel with STEP 208. The S-MSC/VLR 114 responds (STEP 230) with a confirmation message or address complete message. The S-MSC/VLR 114 sets up the incoming call and alerts (STEP 232) the called party device 104. When the called party answer (STEP 234), the S-MSC/VLR 114 sends (STEP 236) an answer message (ANM) to the G-MSC/VLR 112. The G-MSC/VLR 112 sends (STEP 238) a release message, for example, an ISUP REL message, to the network component 116 to release network resources employed for delivery of the user message. The network component 116 releases the network resources and sends (STEP 240) an ISUP release complete message (RLC) to the G-MSC/VLR 112. Where the user message comprises a video user message, the network component 116 signals (STEP 242) the content server 118 to stop the video stream. For example, the network component 116 sends an RTSP PAUSE message and RTSP TEARDOWN message to the content server 118 through the client side RTSP stack. The G-MSC/VLR 112 connects (STEP 244) the incoming call from the calling party device 102 with the called party device 104, and voice communication between users of the calling party device 102 and the called party device 104 ensues.

Turning to FIG. 3, an apparatus 300 comprises one implementation of a communication network 301. The communication network 301 comprises an alternative embodiment of the communication network 101. The communication network 301 comprises the calling party device 102, the called party device 104, the calling party network 105, and the called party network 106. In this embodiment, the calling party network 105 comprises a serving mobile switching center 302 for the calling party device 102, a home location register (HLR) 304 for the calling party device 102, and a network component/content server 306. The network component/content server 306 comprises a combination of the network component 116 and the content server 118, but may also be separate components. The network component/content server 306 performs selection, storage, and delivery of the user message. The mobile switching center 302 in one example performs one or more of the steps of the G-MSC/VLR 112, but in the calling party network 105 instead of the called party network 106. The HLR 304 in one example employs an originating attempt detection point to cause the serving mobile switching center 302 to redirect the incoming call to the network component/content server 306. For example, the HLR 304 employs the originating attempt detection point to trigger a download of the user profile from the profile server 122. The user profile in this embodiment may comprise the opt-in status of the calling party device 102 and an address for the network component/content server 306. The serving mobile switching center 302 redirects the call to the network component/content server 306, as will be appreciated by those skilled in the art.

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 100 comprise the recordable data storage medium 126 of the calling party device 102, the network component 116, the content server 118, the profile server 122, the location server 124, and the profile/location server 201. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
    receiving a call setup message for a circuit-switched voice call from a calling party device to a called party device, wherein the call setup message comprises an initial address message (IAM);
    obtaining a directory number for the calling party device from the call setup message for the circuit-switched voice call;
    determining a service provider of the calling party device through employment of a lookup table and the directory number;
    requesting at least one calling party parameter from the service provider of the calling party device, wherein the at least one calling party parameter comprises a data channel address and a user profile for the calling party device, wherein the step of requesting the at least one calling party parameter comprises a step of:
    obtaining the user profile for the calling party device, and wherein the step of obtaining the user profile for the calling party device comprises the steps of:
    obtaining the user profile for the calling party device from a profile server of a calling party network for the calling party device; and
    determining from the user profile an opt-in status for an advertisement service, wherein the user message comprises an advertisement message;
    selecting a user message based on the at least one calling party parameter; initiating delivery of the user message to the data channel address of the calling party device in parallel with a call setup by a serving mobile switching center for the circuit-switched voice call from the calling party device to the called party device.

2. The method of claim 1, wherein the circuit-switched voice call comprises an incoming call, wherein the step of requesting the data channel address and the at least one calling party parameter from the service provider comprises the step of:
    requesting the data channel address from an authentication, authorization, and accounting (AAA) RADIUS billing record database of the service provider.

3. The method of claim 1, wherein the step of initiating delivery of the user message to the data channel address of the calling party device in parallel with the call setup for the circuit-switched voice call from the calling party device to the called party device comprises the step of:
    sending a data content address for the user message to the calling party device through a data channel.

4. The method of claim 3, further comprising the steps of:
    receiving a request for the user message from the calling party device through the data channel;
    the method further comprising one of:
    sending the user message to the calling party device through the data channel; or
    forwarding the request to a content server for delivery of the user message by the content server.

5. The method of claim 4, wherein the user message comprises a video stream, the method further comprising the step of:
    exchanging at least one video stream parameter with the calling party device;
    wherein the step of forwarding the request to the content server for delivery of the user message by the content server comprises the step of:
    forwarding the request with the at least one video stream parameter for delivery of the video stream to the calling party device.

6. The method of claim 5, further comprising the step of:
    controlling a duration of delivery of the video stream from the content server to the calling party device through the data channel.

7. The method of claim 1, wherein the user message comprises an audio message and a data message, wherein the step of initiating delivery of the user message to the data channel address of the calling party device in parallel with the call setup for the circuit-switched voice call from the calling party device to the called party device comprises the steps of:
    initiating delivery of the audio message to the calling party device through an audio channel;
    initiating delivery of the data message to the calling party device through a data channel;
    establishing a mapping between the audio message and the data message;
    stopping the audio message if the data message has an audio track.

8. An apparatus, comprising:
    a network component of a communication network that receives an incoming circuit-switched voice call that is redirected by a serving mobile switching center in parallel with a call setup of the incoming call, wherein the incoming circuit-switched voice call is for a called party device and from a calling party device;
    wherein the network component obtains a directory number from a call setup message for the incoming call, wherein the call setup message comprises an initial address message (IAM),
    wherein the network component determines a service provider of the calling party device through employment of a lookup table and the directory number,
    wherein the network component requests at least one calling party parameter from the service provider of the calling party device, wherein the at least one calling party parameter comprises a data channel address and a user profile for the calling party device,
    wherein the network component obtains the user profile for the calling party device from a profile server of a calling party network for the calling party device,
    wherein the network component determines from the user profile an opt-in status for an advertisement service, wherein the user message comprises an advertisement message,
    wherein the network component selects a user message based on the at least one calling party parameter, and
    wherein the network component initiates delivery of the user message to the data channel address of the calling party device in parallel with the call setup by the serving mobile switching center of the incoming circuit-switched voice call.

9. The apparatus of claim 8, wherein the network component sends a data content address for the user message to the calling party device through at least one data channel;
wherein the network component comprises the user message;
wherein the network component delivers the user message to the calling party device through the at least one data channel upon request by the calling party device.

10. The apparatus of claim 8, further comprising:
a content server;
wherein the network component sends a data content address for the user message to the calling party device;
wherein the content server comprises the user message;
wherein the calling party device obtains the user message from the content server through at least one data channel with the data content address.

11. The apparatus of claim 8, wherein the network component sends a data content address for the user message to the calling party device through at least one data channel, wherein the user message comprises a video stream, wherein the network component comprises the video stream;
wherein the network component exchanges at least one video stream parameter with the calling party device;
wherein the network component delivers the video stream through the at least one data channel to the calling party device.

12. The apparatus of claim 8, further comprising:
a content server;
wherein the network component sends a data content address for the user message to the calling party device, wherein the user message comprises a video stream;
wherein the network component exchanges at least one video stream parameter with the calling party device;
wherein the network component sends a request to a content server with the at least one video stream parameter for delivery of the video stream through at least one data channel to the calling party device by the content server.

13. The apparatus of claim 12, wherein the network component sends at least one control message to the content server to control delivery of the video stream through the at least one second data channel.

14. The apparatus of claim 8, wherein the network component sends a query with a network access identifier to at least one billing record database, for authentication, authorization and accounting (AAA) remote authentication dial in user service (RADIUS), of the service provider to obtain the data channel address of the calling party device.

15. The apparatus of claim 8, wherein the network component obtains the user profile for the calling party device from a profile server of a calling party network for the calling party device.

16. The apparatus of claim 8 in combination with the calling party device;
wherein the calling party device comprises a user interface for display and/or modification of at least one user-defined parameter of the user profile;
wherein the calling party device comprises a user interface for presentation of the user message.

17. The apparatus of claim 16, wherein the at least one user-defined parameter of the user profile comprises a location parameter that identifies a user preference for a home location or current location for selection of the user message;
wherein the network component selects the user message based on the location parameter.

18. The apparatus of claim 8, wherein the user message comprises a plurality of messages delivered through at least one of an audio channel and a data channel to the calling party device in parallel with the call setup of the incoming circuit-switched voice call by the serving mobile switching center.

19. The apparatus of claim 8, wherein the communication network comprises a calling party network and a called party network;
wherein the network component comprises a ringback tone server of the called party network;
wherein the serving mobile switching center comprises a home mobile switching center of the called party network for the called party device;
wherein the ringback tone server receives the incoming circuit-switched voice call from the serving mobile switching center;
wherein the ringback tone server obtains the at least one calling party parameter from the calling party network.

20. An apparatus, comprising:
a calling party network; and
a called party network;
wherein the calling party network comprises a network component and a serving mobile switching center;
wherein the serving mobile switching center redirects an incoming circuit-switched voice call to the network component in parallel with a call setup of the incoming circuit-switched voice call, wherein the circuit-switched voice call is for a called party device and from a calling party device,
wherein the network component obtains a directory number from a call setup message for the incoming circuit-switched voice call, wherein the call setup message comprises an initial address message (IAM),
wherein the network component determines a service provider of the calling party device through employment of a lookup table and the directory number,
wherein the network component requests at least one calling party parameter from the service provider, wherein the at least one calling party parameter comprises a data channel address and a user profile for the calling party device,
wherein the network component obtains the user profile for the calling party device from a profile server of a calling party network for the calling party device,
wherein the network component determines from the user profile an opt-in status for an advertisement service, wherein the user message comprises an advertisement message,
wherein the network component selects a user message based on the at least one calling party parameter, and
wherein the network component initiates delivery of the user message to the data channel address of the calling party device in parallel with a call setup by the serving mobile switching center of the incoming circuit-switched voice call.

21. The apparatus of claim 20, wherein the calling party network comprises a home location register;
wherein the home location register employs an originating attempt detection point to cause the serving mobile switching center redirect the incoming circuit-switched voice call to the network component.

* * * * *